US012507699B2

(12) United States Patent
Lakshmi Kanthan et al.

(10) Patent No.: US 12,507,699 B2
(45) Date of Patent: Dec. 30, 2025

(54) NATURAL MOSQUITO REPELLENT COMPOSITION AND PROCESS OF PREPARING THE SAME

(71) Applicant: COROMANDEL INTERNATIONAL LTD., Secunderabad (IN)

(72) Inventors: Baburaj Lakshmi Kanthan, Chennai (IN); Kothapalli Narasimha Rao, Arlington, TX (US); Sambamoorthy Balaji, Cuddalore (IN); Radhakrishnan Ramamurthi, Cuddalore (IN); Kathiresan Sadhasivam, Cuddalore (IN); Chinaga Suresh Kumar, Cuddalore (IN); Ponnusamy Manimaran, Cuddalore (IN); Govindasamy Jayabal, Cuddalore (IN)

(73) Assignee: COROMANDEL INTERNATIONAL LTD., Secunderabad (IN)

( * ) Notice: Subject to any disclaimer, the term of this patent is extended or adjusted under 35 U.S.C. 154(b) by 786 days.

(21) Appl. No.: 17/621,506

(22) PCT Filed: Jun. 22, 2020

(86) PCT No.: PCT/IB2020/055852
§ 371 (c)(1),
(2) Date: Jan. 18, 2022

(87) PCT Pub. No.: WO2020/261084
PCT Pub. Date: Dec. 30, 2020

(65) Prior Publication Data
US 2022/0354126 A1 Nov. 10, 2022

(30) Foreign Application Priority Data

Jun. 24, 2019 (IN) .............................. 201841048985

(51) Int. Cl.
| | | |
|---|---|---|
| *A01N 65/26* | (2009.01) | |
| *A01N 25/02* | (2006.01) | |
| *A01N 31/02* | (2006.01) | |
| *A01N 65/06* | (2009.01) | |
| *A01N 65/28* | (2009.01) | |
| *A01N 65/44* | (2009.01) | |
| *A01P 17/00* | (2006.01) | |

(52) U.S. Cl.
CPC ............. *A01N 65/26* (2013.01); *A01N 25/02* (2013.01); *A01N 31/02* (2013.01); *A01N 65/06* (2013.01); *A01N 65/28* (2013.01); *A01N 65/44* (2013.01); *A01P 17/00* (2021.08)

(58) Field of Classification Search
None
See application file for complete search history.

(56) References Cited

U.S. PATENT DOCUMENTS 7,344,728 B1 * 3/2008 Perry .................... A01N 65/06
424/59
2017/0295801 A1   10/2017 Waite

FOREIGN PATENT DOCUMENTS

IN     1854CHE2006 A    11/2008
WO    WO-2013050967 A1 *  4/2013 ............. A01N 25/02

OTHER PUBLICATIONS

PCT International Search Report and Written Opinion dated Oct. 13, 2020 for International Application No. PCT/IB2020/055852, 9 pages.
Traditional Knowledge Resource: JA6/784R (Dhooni Salikha) (http://www.tkdl.res.in), 1926, 2 pages.
Traditional Knowledge Resource: JA6/973H1 (Raughan-e-Neem Bara-e-Amraaz-e-Jild) (http://www.tkdl.res.in), 1926, 2 pages.
Traditional Knowledge Resource: JA7/17A18 (Qatoor Lahm-e-Sartaan) (http://www.tkdl.res.in), 1887, 2 pages.
Traditional Knowledge Resource: JA7/46700 (Pudina Patti Daafe Hashraat) (http://www.tkdl.res.in), 1887, 1 page.
Traditional Knowledge Resource: JA7/494Q (Tila Qutraan Dafi'-e-Hasharaat) (http://www.tkdl.res.in), 1887, 2 pages.
Traditional Knowledge Resource: MH2/72 (Qaisoom) (http://www.tkdl.res.in), 1874, 2 pages.
Traditional Knowledge Resource: MH6/283 (Feel) (http://www.tkdl.res.in), 1874, 2 pages.
Traditional Knowledge Resource: NA4/936A (Dafi-e-hashraat-ul-arz) (http://www.tkdl.res.in), 1928, 2 pages.
Traditional Knowledge Resource: NA4/940 (Dafi-e-hashraat-ul-arz) (http://www.tkdl.res.in), 1928, 2 pages.
Traditional Knowledge Resource: NA4/945 (Dafi-e-hashraat-ul-arz) (http://www.tkdl.res.in), 1928, 2 pages.
Traditional Knowledge Resource: NA4/946C (Dafi-e-hashraat-ul-arz) (http://www.tkdl.res.in), 1928, 2 pages.

* cited by examiner

*Primary Examiner* — Susan Hoffman
(74) *Attorney, Agent, or Firm* — RMCK Law Group, PLC

(57) ABSTRACT

The present invention relates to a natural mosquitoes repellent composition comprising: neem oil, a mixture of plant extracts and solvent. The present invention particularly relates to the natural mosquito repellent composition comprising neem oil, a mixture of plant extracts, such as Geraniol, Eucalyptus oil, Cedar oil and Citronella oil. The present invention further provides a process for preparing the mosquito repellent composition.

4 Claims, No Drawings

NATURAL MOSQUITO REPELLENT COMPOSITION AND PROCESS OF PREPARING THE SAME

CROSS-REFERENCE TO RELATED APPLICATIONS

This application is a 371 U.S. National Stage of International Application No. PCT/IB2020/055852, filed Jun. 22, 2020, which claims priority to Indian Patent Application number 201841048985, filed Jun. 24, 2019. The disclosures of each of the above applications are incorporated herein by reference in their entirety.

FIELD OF THE INVENTION

The present invention relates to a natural mosquito repellent composition. More particularly, the present invention relates to the natural mosquito repellent composition comprising a neem oil, a mixture of other plant extracts and additives. The present invention also relates to a process of preparing the natural mosquito repellent composition.

BACKGROUND OF THE INVENTION

Mosquito menace is a global problem. Mosquito-borne diseases or mosquito-borne illnesses are diseases caused by bacteria, viruses or parasites transmitted by mosquitoes. Nearly 700 million people get a mosquito-borne illness each year resulting in over one million deaths. Diseases transmitted by mosquitoes include malaria, dengue, West Nile virus, chikungunya, yellow fever, dirofilariasis, filariasis, tularemia, Japanese encephalitis, Saint Louis encephalitis, Western equine encephalitis, Eastern equine encephalitis, Venezuelan equine encephalitis, Ross River fever, Barmah Forest fever, La Crosse encephalitis, and Zika fever. Developed countries such as USA, developing and least developed countries are all affected by the menace of the mosquitoes. Unsuccessful attempts have been made to control the mosquito menace and to eradicate the scourge of malaria and other diseases.

However, elimination or eradication of mosquitoes or mosquitoes larvae, as well as development of safer, less toxic, more effective, human-friendly mosquito repellents have not been researched extensively. There are very few natural or herbal solutions for repelling mosquitoes reported in the literature. The problem with natural mosquito repellent is that they require more frequent reapplication (at least every 2 hours) and in higher concentration. The known natural repellents are based on volatile plant oils such as citronella oil, castor oil, rosemary oil, lemongrass oil, cedar oil, peppermint oil, clove oil, geranium oil and possibly oils from verbena, pennyroyal, lavender, pine, cajuput, cinnamon, basil, thyme, allspice, soybean and garlic. Another plant-derived substance, pyrethrum is an insecticide which comes from the flowers of the daisy *Chrysanthemum cinerariifolium*.

Some examples of known natural mosquito repellents include citronella candles made from citronella oil, and moth balls, which contain chemicals (camphor, para-dichlorobenzene, Napthalene) and/or cedar wood. Over the last century, synthetic chemicals have been developed that more effectively repel mosquitoes. Some of these synthetic chemicals include 2-ethyl-3-hexanediol, DDT and DEET (N, N-diethyl-meta-toluamide).

U.S. Pat. No. 4,663,346 discloses insect repellants with compositions containing bicyclic iridoid lactones (e.g., iridomyrmecin).

U.S. Pat. No. 4,869,896 discloses use of these bicyclic iridoid lactone compositions in potentiated insect repellent mixtures with DEET.

However, the synthetic chemical repellents, especially DEET, can be readily absorbed through the skin, causing many accidental poisonings. DDT in particular has been shown to be very harmful to the environment, and DEET is suspected to be a carcinogen, teratogen and/or mutagen. Most of these synthetic chemicals are toxic in certain amounts. Therefore, some states have limited the percentage of synthetic toxic chemicals, especially DEET (e.g. to levels of 10-30%), which may be included in any formulation for human or animal use.

A large number of plants have been tested as potential sources of natural mosquito repellents. Plant derived chemicals, phytoextracts and essential oils do not demonstrate the effectiveness for a wider range and duration as compared to chemical repellents.

Plants are considered as a rich source of bioactive chemicals and they may be an alternative source of mosquito repellent agents. Natural products are generally preferred because of their less harmful nature to non-target organisms and due to their innate biodegradability. Existing natural mosquito repellent formulations are not so effective. So, there is a need to develop an efficient natural mosquito repellent formulation.

OBJECTS OF THE INVENTION

A primary object of the present invention is to provide a novel natural mosquito repellent compositions that primarily contain neem oil.

In another object of the present invention is to provide the natural mosquito repellent compositions containing neem oil in combination with mixture of plant extracts of other plants and additives.

In yet another object of the present invention is to provide the natural mosquito repellent compositions containing neem oil in combination with mixture of plant extracts such as Geraniol, Eucalyptus oil, Citronella oil and cedar oil along with additives.

In yet another object of the present invention is to provide a safe, non-toxic natural mosquito repellent compositions and methods for killing and/or repelling mosquitoes that will not harm the environment.

In yet another object of the present invention is to provide a method for controlling mosquito by the application of effective amounts of the natural mosquito repellent compositions comprising neem oil in combination with mixture of plant extracts of other plants to an area where such mosquito control is desired.

In yet another object of the present invention is to provide the natural mosquito repellent compositions comprising neem oil in combination with mixture of plant extracts of other plants that has a pleasant scent and that can be used without burdensome safety precautions.

In yet another object of the present invention is to provide a process for preparation mosquito repellent composition.

SUMMARY OF THE INVENTION

The present invention relates to the natural mosquito repellent compositions and process of preparing the same. The application enables, describes, and claims the natural mosquito control compositions comprising neem oil, mixture of plant extracts and solvent. Non-limiting examples of plant extracts include from the group consisting of but not limited to cedar oil, eucalyptus oil, pepper mint oil, eugenol, rosemary oil, cinnamon oil, clove oil, citronella oil, geraniol, garlic oil, black pepper oil, mint oil, thyme oil, basil oil, camphor oil, lemon grass oil, henna oil, cotton seed oil, cedar leaf oil, mustard oil, corn oil, marigold oil and combinations thereof.

In accordance with another embodiment of the instant invention relates to natural mosquito repellent compositions comprising the neem oil, the mixture of plant extracts of Geraniol, Eucalyptus oil, Citronella oil, Cedar oil, and the solvent.

In accordance with another embodiment, the instant invention relates to natural mosquito repellent compositions comprising: the neem oil in a range from 0.1% to 80% (w/w), the mixture of plant extracts of Geraniol, Eucalyptus oil, Citronella oil and Cedar oil and in a range from 1-90% (w/w), and the solvent in a range from 1-90% (w/w).

In accordance with another embodiment of the present invention the natural mosquito repellent compositions is formulated in form of liquid, solid or semi-solid state, emulsion or emulsifiable concentrate or Ready to Use.

In accordance with another embodiment of the present invention provides a process for preparation of mosquito repellent composition comprising steps of: weighing neem oil in a predetermined amount, weighing solvent in predetermined amount, adding solvent to neem oil with continuous stirring at 250 rpm for 30 minutes, adding mixture of plant extracts in a predetermined amount with continuous stirring for 60 minutes at 250 rpm.

DESCRIPTION OF THE INVENTION

The present invention provides a novel, stable and bio-efficacious natural mosquito repellent compositions. The novel compositions of the present invention comprises combinations of neem oil and plant extracts of Geraniol, Eucalyptus oil, Citronella oil and Cedar oil along with other additives.

It is to be noted, as used in the specification and claims, the singular forms "a", "an", and "the" include plural referents unless the context clearly dictates otherwise. Thus, for example, reference to a composition containing "a compound includes a mixture of two or more compounds. It should also be noted that the term "or" is generally employed in its sense including "and/or" unless the content clearly dictates otherwise. The expression of various quantities in the terms of "% w/w" or "%" means the percentage by weight, relative to the weight of the total composition unless otherwise specified.

As used herein, a "mosquito repellent composition" is a composition which repels mosquito. Repellence may be determined by either the inhibition of mosquito approach, landing on a target or stinging. The "mosquito repellent" may also include killing the mosquito. The "mosquito repellent" also includes minimizing the landings of the mosquito on a target area, including entry of the target mosquitoes into building structures.

As used herein, "knockdown" activity refers to the mosquitocidal activity of the compositions when used in target area in a mosquito repellent vaporizer assembly.

As used herein, target areas include, but are not limited to, areas on humans, animals, birds, fields, greenhouses, barns granaries, homes, decks, pools, commercial buildings, clothing, tents, and the like. Animals include but are not limited to domestic animals, farm animals, wild animals, pets, and zoo animals.

As used herein, the term "synergistic effect" means a time of mosquito repellence achieved with a combination of two or more active ingredients which is longer than the greatest time of repellence achieved for any one of the ingredients when used as the sole active ingredient.

As used herein, a "plant extract" means a substance derived from the leaves, stem, flower or twigs of plants that have the same chemical attributes. The plant extract usually carries the odor or flavor of the plant and some desirable properties. As used herein, "plant extract" includes derivatives thereof, including racemic mixtures, enantiomers, diastereomers, hydrates, salts, solvates, metabolites, analogs, and homologs. Plant extracts in the context of the invention may include, without being limited thereto, a plant extract selected from lemongrass oil, citronella oil, geraniol oil, eucalyptus oil, tea tree oil, lavender oil, spearmint oil, geranium oil, rosemary oil, lemon balm oil, peppermint oil, pine needle oil, lavandin oil, geraniol, cinnamon oil, clove oil, thyme oil, wintergreen oil, cedar oil, lemon oil, grapefruit oil, mandarin oil, tangerine oil, orange oil, citrus oil, lime oil, coriander oil, pomegranate oil, soybean oil, cajeput oil, walnut oil, peanut oil, corn oil, canola oil, sunflower oil, sesame oil, linseed oil, safflower oil, olive oil, etc. and combinations thereof.

When the plant extract is a mixture of compounds, the present invention encompasses each of the constituent compounds of the plant extract. The present invention also encompasses variants or mimics of such compounds that share one or more of their characteristics or functions.

As these plant extract compounds are known and used for other uses, they may be routinely prepared by a skilled artisan by employing known methods. Exemplary methods for deriving a plant extract include steam distillation, pressing fruit rinds, solvent extraction, macerating the flowers and leaves in fat and treating the fat with solvent, enfleurage and synthetically.

As used herein, "neem oil" refers to oil derived from the seeds, leaves, and bark of *Azadirachta indica*. Methods for obtaining neem oil, azadirachtin extract or other derivatives purified from neem oil are known in the art. One exemplary method for obtaining neem oil is cold pressing. In the embodiments, the mosquitocidal neem oil is cold pressed neem oil or a component or derivative thereof. The most important and biologically proven active constituent of neem seed is azadirachtin. Several isomers of azadirachtin have been identified and out of the isomers the most potent and active component is the Azadirachtin A. The mosquitocidal neem oil is any oil having as a constituent one of the following compounds, or a combination of the following compounds: azadirachtin, nimbin, nimbinin and salannin. Neem oil is commercially available. In the present invention neem oil is a cold pressed neem oil derived from the kernels of the neem seeds. The percentage of active neem oil is 50-60%. The range of neem oil in the mosquito repellent composition is 0.1% to 80% (w/w).

As used herein, "geraniol" is an acyclic monoterpene alcohol with the chemical formula $C_{10}H_{18}O$. Geraniol IUPAC name is (2E)-3,7-dimethylocta-2,6-dien-1-ol. The product referred to as "geraniol" is a mixture of the two cis-trans isomers properly named geraniol (trans) and nerol (cis).

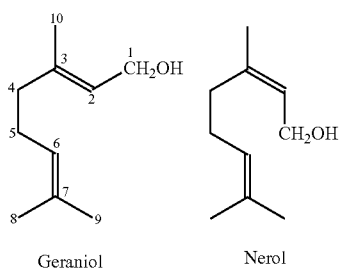

Geraniol    Nerol

Geraniol is found within many essential oils of fruits, vegetables, and herbs including rose oil, citronella, lemongrass, thyme, lavender, and other aromatic plants. Geraniol appears as a clear to pale-yellow oil which is insoluble in water, but soluble in most organic solvents. It is emitted from the flowers of many species and it is present in vegetative tissues of many herbs and often co-exists with geranial and neral, which are the oxidation products of geraniol. In the present invention Geraniol is obtained from Geranium oil and citronella oil. The percentage of active geraniol in the extract is between 60-96%. The range of geraniol in the mosquito repellent composition is 1% to 90% (w/w).

As used herein, "eucalyptus oil" refers to the essential oil from the Eucalyptus, *Eucalyptus globulus* and *Eucalyptus radiate*. The essential oil is generally recovered by steam distillation of the leaves. The chemical constituents include various amounts of 1,8-cineol, α-, β-, and γ-terpinene, β-pinene, terpinen-4-ol, linalool oxide, α-gurjunene, aromadendrene, alloaromadendrene, globulol(10-hydroxyaromadendrene (e.g., see Nishimura, *J Argic Food Chem* 27(2): 432-435 (1979)). Cineole is the major constituent. The eucalyptus oil is commercially available. In the present invention Eucalyptus oil is extracted from the leaves of the Eucalyptus tree. The active cineole is between 70 to 90% of the eucalyptus extract. The range of Eucalyptus oil is 1% to 90% (w/w) of the mosquito repellent composition.

Citronella oil is a plant extract that is obtained from leaves and stem of one of the plants of the lemongrass species. When the leaves and stems of this plant are crushed, they release citronella oil. Citronella oil is popularly used as an insect repellent. Citronella is safe and non-toxic to humans and animals. The range of Citronella oil is 1% to 90% (w/w) of the mosquito repellent composition.

Cedar oil, also known as cedar-wood oil, refers to the volatile whole oil extracts derived principally from the heartwood of *Juniperus virginiana* or *Juniperus ashei*. The cedarwood oil is generally obtained by steam distillation. The crude oil is a viscous liquid having an odor, which is pleasant, sweet woody yet somewhat tar-like or cade-like and smoky. The components found in cedarwood oil include cedrine, cedrol, and thujopsene. Depending on the amount of cedrol in a specific species of cedar can determine its pesticidal effect on mosquitoes. The range of Cedar oil is 1% to 90% (w/w) of the mosquito repellent composition.

As used herein "solvent" is used to disperse active ingredient uniformly and helps to release active ingredient constantly during evaporation. Example of solvent for use in the present invention include but not limited to Isopropyl alcohol, Methanol, Ethanol, acetophenone, deodorized kerosene, 2-Butanol, N-Butanol, Tert-Butyl alcohol, Di(propylene glycol) methyl ether, Diethylene glycol, Ethylene glycol, 2-Ethylhexanol, Furfuryl alcohol, Glycerol, Isobutanol, 2-(2-Methoxyethoxy)ethanol, 2-Methyl-1-butanol, 2-Methyl-1-pentanol, 3-Methyl-2-butanol, Neopentyl alcohol, 2-Pentanol, 1,3-Propanediol, 1-Propanol, Propylene glycol, Propylene glycol methyl ether, Benzyl benzoate, 2-Butoxyethanol acetate, Butyl acetate, Sec-Butyl acetate, Tert-Butyl acetate, Ethyl acetate, Ethyl acetoacetate, Ethyl butyrate, Ethyl lactate, Ethylene carbonate, Hexyl acetate, Isoamyl acetate, Isobutyl acetate, Isopropyl acetate, Methyl acetate, Methyl lactate, Methyl phenylacetate, Methyl propionate, Propyl acetate, Propylene carbonate, Triacetin, methyl acetate, tert-butyl acetate, dimethyl carbonate, propylene carbonate, propylene glycol monomethyl ether, propylene glycol monopropyl ether, dipropylene glycol monopropyl ether, propylene glycol monobutyl ether, dipropylene glycol monobutyl ether, propylene carbonate, ethylene glycol monomethyl ether, diethylene glycol monomethyl ether, ethylene glycol monobutyl ether, diethylene glycol monobutyl ether, cyclohexane, cycloheptane, methyl cyclohexane, 1,4-dimethyl cyclohexane, benzene, amyl benzene, secondary butyl benzene, toluene, o-ethyl toluene, o-xylene, 4-ethyl-o-xylene, m-xylene, p-xylene, 2-ethyl-p-xylene and combinations thereof. The preferred solvent in the present invention is isopropyl alcohol or ethyl alcohol. Preferably, the solvents are Isopropyl alcohol and Acetophenone. The solvents are present in a range of 1 to 90% (w/w) of the mosquito repellent composition.

The natural mosquito repellent compositions optionally include a fragrance that is not an insect attractant. Such fragrances are known to one of ordinary skill in the art. Additionally, the composition can comprise other optional ingredients. These optional ingredients include colorants like dyes and pigments, other oils, gellants, stabilizers, synergists, solubilizers and surfactants. The optional ingredients are present in a range 0.1% to 10% (w/w) of the mosquito repellent composition in the present invention.

The natural mosquito repellent compositions of the present invention are formulated in a liquid, solid or semi-solid state emulsion or emulsifiable concentrate and are effective against all the mosquito species (*Aedes* spp, *Culex* Spp, *Anopheles* spp, *Culiseta* app.). The semi-solid state gel can be of any composition wherein the mosquito repellant is released in an effective manner. The gel may be composed of materials that are not reactive with the mosquito repellant compositions.

The natural mosquito repellent compositions of the present invention are preferably in the liquid state i.e. as Ready to Use (RTU) liquid vaporizer composition. One preferred embodiment uses a system that minimizes the potential for spillage. This can be accomplished using wicks, blotters, sponges, porous ceramics, porous plastics and other adsorbent or absorbent methods or materials that will adsorb or absorb the repellent and allow its release over time.

The natural mosquito repellent compositions can be used with an adsorbent or absorbent pad instead of incorporated into a gel. The adsorbent or absorbent pad can be composed of any paper, sponge, cellulose, wood, non-woven or cloth that allows for the release of the natural mosquito repellant of the present invention in an effective manner.

The natural mosquito repellent compositions of the present invention is preferably meant for use in a vaporizer assembly. A vaporizer assembly for repelling mosquitoes comprises: a material holder wherein a liquid natural mosquito repellent compositions of the present invention is placed; a wick; wherein said wick is placed on to a wick holder and is supported by a wick supporter; and a heating arrangement, wherein said heating arrangement is placed at the upper end of said wick. There are 3 main parts of mosquito repellent liquid composition vaporizer assembly: 1) Wick 2) Liquid formulation 3) Vaporizer (A mean to disperse liquid formulation in the surrounding).

Mainly marketed mosquito repellent systems are using carbon wick with some binding agents to convey the liquid formulation to the vaporizer which is electrically heated. Main characteristic of the wick is its wettability characteristic and capillary action, its porosity also affects the vaporization rate. It is a tendency of any material to get wet through capillary action by the like liquid. Due to high temperature in vaporizer, formulation which is trapped in the wick (after get wetted throughout), gets vaporized into atmosphere. So as the liquid get vaporized from the wick, remaining liquid formulation saturates the wick up to saturation limit, that limit depends on the wetting characteristic and hold up of material depends on its porosity. The wick must convey the liquid formulation to the heating zone of vaporizer machine section to get vaporized at certain rate in certain temperature range.

Alternatively the repallant may be contained in a container and dispensed gradually or on demand to dispersing system that uses a liquid. This dispersing means may spray, atomize or evaporate the liquid to disperse it into the surrounding air.

A method of repelling or killing mosquito using the natural mosquito repellent composition of the present invention comprises the step of putting the thermal vaporization/diffusion absorbent wick in the mosquito repellent composition so that the composition is absorbed and transported to a top portion of the thermal vaporization/diffusion absorbent wick, and heating the top portion of the thermal vaporization/diffusion absorbent wick at 110-120° C. so that the mosquito repellent composition is vaporized and diffused into the atmosphere.

One of skill in the art could readily modify this to make a formulation for application directly on the user's skin (as a cream or lotion, for example) or clothes (as an aerosol spray, for example) and emulsifiable concentrate. This enables a user to use the present invention while outdoors.

The following examples illustrate, but in no way are intended to limit the present invention.

Example 1: Process for Formulating the Natural Mosquito Repellent Compositions

The primary active ingredient the neem oil is weighed in a predetermined amount as given in Table 1 and taken in a vessel. The pre-determined amount of the solvent isopropyl alcohol or acetophenone is added slowly to the neem oil in the vessel with a continuous stirring at 250 rpm for 30 min. To this solution other essential oils like Geraniol, Eucalyptus oil, Citronella oil and Cedar oil is added in the ranges as given in Table 1 with continued stirring for another 60 min at 250 rpm to obtain a final formulation. The mixing is carried out at ambient temperature and pressure.

TABLE 1

Different formulations of the natural mosquito repellent composition

| Formulation | Neem oil % (w/w) | Geraniol (% w/w) | Eucalyptus Oil (% w/w) | Citronella oil (% w/w) | Cedar Oil (% w/w) | Solvent (% w/w) |
| --- | --- | --- | --- | --- | --- | --- |
| 1 | 0.1 | 2.5 | 1 | 1.5 | 1 | 93.9* |
| 2 | 80 | 2.5 | 2.5 | 2.5 | 1 | 11.5* |
| 3 | 0.3 | 2.5 | 1 | 2.5 | 0 | 93.7** |
| 4 | 3 | 90 | 1 | 1 | 1 | 4* |
| 5 | 0.1 | 2.5 | 1 | 1 | 1 | 94.4** |
| 6 | 0.1 | 2.5 | 90 | 1 | 1 | 5.4** |
| 7 | 1 | 2.5 | 5 | 1 | 1 | 89.5** |
| 8 | 4 | 2.5 | 1 | 90 | 1 | 1.5** |
| 9 | 1 | 2.5 | 5 | 1 | 1 | 89.5** |
| 10 | 4 | 2.5 | 1 | 1 | 90.5 | 1** |
| 11 | 1 | 2 | 5 | 1 | 1 | 90** |
| 12 | 10 | 1 | 1 | 5 | 1 | 82* |

*Acetophenone;
**Isopropyl Alcohol

Example 2: Shelf Life of the Natural Mosquito Repellent Compositions

The formulation 3 from example 1 was analysed for stability through accelerated stability study at 54° C. and 50% RH. The result of the stability study is tabulated in Table 2. The stability study is known as accelerated stability study as it is not done in real time but conducted at 54° C. and 50% RH. The prepared formulation 3 is transferred into glass vials and placed inside a stability chamber to analyse the degradation of the active material. Generally for azadirachtin, 7 days of accelerated stability study is equivalent to 6 months in real time stability.

TABLE 2

Shelf life stability of the mosquito killing formulation

| Sample ID | No. of Days @54° C. | Azadirachtin(%) | Drop(%) |
| --- | --- | --- | --- |
| Formulation 3 | 0 | 0.323 | |
| | 7 | 0.322 | 0.31 |
| | 14 | 0.321 | 0.62 |
| | 21 | 0.316 | 2.17 |
| | 28 | 0.301 | 6.68 |
| | 35 | 0.282 | 12.69 |

Example 3: Method for Determining the Synergy of the Natural Mosquito Repellent Composition Rearing Technique for Mosquitoes:
For the purpose of the present invention, the larvae/pupae are reared under optimal conditions at 27±2° C., relative humidity 80±10%, and photoperiod 16:8 hours (light:dark). Feeding of adults is done by providing a cotton pad soaked with 10% sucrose solution. The mosquitoes were not provided with any blood meal before the test. Mosquitoes are starved for 12 hours before the test. The test insects are used for only one test, and they are incinerated after the test. Number of mosquitoes used is 100 per cage per repetition.

Procedure for Determining the Synergy of the formulations:

The refillable bottle of any mosquito repellent vaporizer machine commercially available in the market is taken and filled with formulations of the present invention. The refillable bottle is fitted to vaporizer machine inside the Peet Grady chamber. Mosquitoes up to 100 in number were released inside the chamber and the vaporizer is burned for 60 minutes. The number of knocked-down mosquitoes is counted at regular intervals, for 60 minutes. The chamber is then quickly ventilated after 60 minutes and mosquitoes are collected in separate cage. The collected mosquitoes are then provided with 10% sugar solution on cotton wool and held for 24 hours and mortality is recorded 24 hours post-exposure.

Initially developed 12 formulations from example 1 were taken and their effectiveness against various mosquito species such as *Aedes aegypti, Aedes albopictus, Culex quinquefaciatus* and *Anopheles stephansi* is studied and is illustrated in the Tables 3 to 6.

TABLE 3

Bio-efficacy of mosquito repellent formulation against *Culex quinquefaciatus*

| Formulation details | % Mortality against *Culex quinquefaciatus* | | | | |
|---|---|---|---|---|---|
| | Day 1 | Day 15 | Day 30 | Day 45 | Day 50 |
| Formulation 1 | 100 | 98 | 95 | 88.2 | 80.2 |
| Formulation 2 | 100 | 98 | 91.2 | 86.2 | 78.2 |
| Formulation 3 | 100 | 98 | 97 | 92 | 84 |
| Formulation 4 | 100 | 98 | 96.2 | 91.2 | 83.2 |
| Formulation 5 | 100 | 98 | 94.4 | 89.4 | 81.4 |
| Formulation 6 | 100 | 98 | 93.8 | 88.8 | 80.8 |
| Formulation 7 | 100 | 98 | 92.1 | 87.1 | 79.1 |
| Formulation 8 | 100 | 98 | 92.5 | 87.5 | 79.5 |
| Formulation 9 | 100 | 98 | 91.5 | 86.5 | 78.5 |
| Formulation 10 | 100 | 98 | 90.6 | 85.6 | 77.6 |
| Formulation 11 | 80 | 70 | 72 | 67 | 59 |
| Formulation 12 | 83 | 77 | 71 | 66 | 58 |

TABLE 4

Bio-efficacy of mosquito repellent formulation against *Aedes aegypti*

| Formulation details | % Mortality against *Aedes aegypti* | | | | |
|---|---|---|---|---|---|
| | Day 1 | Day 15 | Day 30 | Day 45 | Day 50 |
| Formulation 1 | 100 | 96.3 | 91.8 | 88.2 | 80.2 |
| Formulation 2 | 100 | 97 | 92.5 | 87.5 | 79.5 |
| Formulation 3 | 100 | 99 | 98 | 93 | 85 |
| Formulation 4 | 100 | 97 | 92.5 | 87.5 | 79.5 |
| Formulation 5 | 100 | 98 | 93.5 | 88.5 | 80.5 |
| Formulation 6 | 100 | 90 | 85.5 | 80.5 | 72.5 |
| Formulation 7 | 100 | 91 | 86.5 | 81.5 | 73.5 |
| Formulation 8 | 100 | 97 | 92.5 | 87.5 | 79.5 |
| Formulation 9 | 100 | 98 | 93.5 | 88.5 | 80.5 |
| Formulation 10 | 100 | 85 | 80.5 | 75.5 | 67.5 |
| Formulation 11 | 80 | 76 | 72 | 67 | 59 |
| Formulation 12 | 83 | 77 | 69 | 64 | 56 |

TABLE 5

Bio-efficacy of mosquito repellent formulation against *Aedes albopictus*

| Formulation details | % Mortality against *Aedes albopictus* | | | | |
|---|---|---|---|---|---|
| | Day 1 | Day 15 | Day 30 | Day 45 | Day 50 |
| Formulation 1 | 100 | 96.3 | 91.8 | 88.2 | 80.2 |
| Formulation 2 | 100 | 97.4 | 92.9 | 87.9 | 79.9 |
| Formulation 3 | 100 | 99.5 | 95 | 90 | 82 |
| Formulation 4 | 100 | 97.4 | 92.9 | 87.9 | 79.9 |
| Formulation 5 | 100 | 92 | 87.5 | 82.5 | 74.5 |
| Formulation 6 | 100 | 91 | 86.5 | 81.5 | 73.5 |
| Formulation 7 | 100 | 98.5 | 94 | 89 | 81 |
| Formulation 8 | 100 | 99 | 94.5 | 89.5 | 81.5 |
| Formulation 9 | 100 | 98 | 93.5 | 88.5 | 80.5 |
| Formulation 10 | 100 | 92 | 87.5 | 82.5 | 74.5 |
| Formulation 11 | 80 | 79 | 71 | 66 | 58 |
| Formulation 12 | 83 | 77 | 70 | 65 | 57 |

It was observed that all formulations 1 to 12 were effective in controlling mosquitoes. The formulations 1 to 10 showed 100% knockdown of mosquitoes on Day 1. Formulation 3 was observed to be the best formulation. Formulation 1, 2, 4, 7, 8, 9 were also exhibiting mortality close to the best formulation 3 even after 50 days of use.

Example 4: Effect of Porosity of the Wick of a Mosquito Repellent Vaporizer Assembly in Controlling Mosquitoes In a mosquito repellent vaporizer systems, the wetting characteristics and porosity of the wick is a limiting factor determining the saturation of the wick and thus amount of the mosquito repellent formulation that vaporizes in the atmosphere to provide relief from mosquitoes. Thus, studies were conducted to identify a suitable wick for liquid vaporizer. Three different wicks were selected with different porosity percentage. The selected wicks and their porosity are as follows: Wick 1 (porosity: 26 to 36%), Wick 2 (porosity: 37 to 47%) & Wick 3 (porosity: 50 to 60%). A mosquito repellent vaporizer is obtained from market and its wick is replaced with wick 1 and the procedure as illustrated in example 3 is conducted with *Aedes aegypti* mosquitoes. The same procedure is repeated for wick 2 and wick 3. The study was carried out on Formulation 3. The results of different wicks are summarized in Table 7.

TABLE 7

Effectiveness of wick in controlling mosquitoes *Aedes aegypti* with Formulation 3

| Time (In mins.) | % Knock down | | |
|---|---|---|---|
| | Wick 1 | Wick 2 | Wick 3 |
| 0-10 min | 23% | 30% | 30% |
| 10-20 min | 46% | 59% | 60% |
| 20-30 min | 68% | 93% | 94% |
| 30-40 min | 93% | 100% | 100% |
| 40-50 min | 98% | 100% | 100% |
| 50-60 min | 100% | 100% | 100% |
| 24 hrs Mortality | 98% | 100% | 100% |

It is observed that wick 2 and wick 3 both show comparable and better result than wick 1. Thus, for obtaining effective result of the natural mosquito repellent compositions of the present invention wick with porosity in a range from 37% to 60% is preferred.

Example 5: Longevity of Efficacy of the Liquid Vaporizer

A mosquito repellent vaporizer with a wick of porosity in range from 37% to 60% is studied for the duration of the efficacy of the compositions of the present invention. Formulation 3 was evaluated for duration of 50 days under the experimental conditions as illustrated in example 3. The same test are repeated for formulation 1 to 12. It was observed that the all the formulations 1 to 12 were efficacious for 50 days.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

The invention claimed is:

1. A mosquito repellent composition, comprising:
 a mixture of plant extracts consisting of:
  neem oil present in a range from 0.1% to 80% (w/w),
  geraniol present in a range from 1% to 2.5% (w/w),
  eucalyptus oil present in a range from 1% to 5% (w/w),
  cedar oil present in a range from 0% to 1% (w/w), and
  citronella oil present in a range from 1% to 5% (w/w), and
 isopropyl alcohol present in a range from 1% to 95% (w/w).

2. The mosquito repellent composition as claimed in claim 1, wherein the mosquito repellent composition is formulated in form of liquid, solid or semi-solid state, emulsion or emulsifiable concentrate.

3. A process for preparation of the mosquito repellent composition of claim 1 comprising the steps of:
 weighing the neem oil in a predetermined amount,
 weighing the isopropyl alcohol in a predetermined amount,
 adding the isopropyl alcohol to the neem oil with continuous stirring at 250 rpm for 30 minutes,
 adding the mixture of plant extracts in a predetermined amount with continuous stirring for 60 minutes at 250 rpm.

4. The process as claimed in claim 3, wherein stirring is carried out at ambient temperature and pressure.

* * * * *